(12) United States Patent
Vann

(10) Patent No.: US 9,945,551 B2
(45) Date of Patent: Apr. 17, 2018

(54) ILLUMINATED EATING UTENSIL AND CONTAINER SYSTEM

(71) Applicant: Gennie Vann, Springfield Gardens, NY (US)

(72) Inventor: Gennie Vann, Springfield Gardens, NY (US)

(*) Notice: Subject to any disclaimer, the term of this patent is extended or adjusted under 35 U.S.C. 154(b) by 170 days.

(21) Appl. No.: 14/866,011

(22) Filed: Sep. 25, 2015

(65) Prior Publication Data

US 2017/0089565 A1 Mar. 30, 2017

(51) Int. Cl.
| | | |
|---|---|---|
| *A47G 21/00* | (2006.01) | |
| *F21V 33/00* | (2006.01) | |
| *F21V 21/40* | (2006.01) | |
| *A01M 29/18* | (2011.01) | |
| *A47G 21/04* | (2006.01) | |
| *A47G 21/02* | (2006.01) | |
| *F21Y 101/02* | (2006.01) | |

(52) U.S. Cl.
CPC ......... *F21V 33/0036* (2013.01); *A01M 29/18* (2013.01); *A47G 21/023* (2013.01); *A47G 21/04* (2013.01); *F21V 21/40* (2013.01); *A47G 2200/08* (2013.01); *A47G 2200/143* (2013.01); *F21Y 2101/02* (2013.01)

(58) Field of Classification Search
CPC ............... F21V 33/0036; F21V 21/40; A47G 2200/143; A47G 2200/08; A47G 21/04; A47G 21/023; A47G 2019/2244; A01M 29/18

USPC .......................................................... 362/109
See application file for complete search history.

(56) References Cited

U.S. PATENT DOCUMENTS

| | | | | |
|---|---|---|---|---|
| 3,510,643 A * | 5/1970 | File | ........................ | A47G 21/02 30/123 |
| 4,346,370 A | 8/1982 | Carter et al. | | |
| 5,189,793 A * | 3/1993 | Ratzon | .................... | A47G 21/04 30/123 |
| 6,092,905 A * | 7/2000 | Koehn | ............... | A47G 23/0216 362/101 |
| 6,305,832 B1 * | 10/2001 | Huang | .................... | A47G 21/00 362/120 |
| 6,511,196 B1 * | 1/2003 | Hoy | .................... | A47G 19/2227 362/101 |
| 6,675,483 B2 | 1/2004 | Bond et al. | | |
| 7,109,849 B2 | 9/2006 | Caine | | |
| 7,311,411 B2 * | 12/2007 | VanderSchuit | ........ | A23G 3/563 362/102 |
| 7,556,392 B2 * | 7/2009 | Weigl, Jr. | ............... | A47G 21/02 362/120 |
| 8,061,860 B2 | 11/2011 | Weigl, Jr. | | |
| 8,444,288 B1 * | 5/2013 | Leal | .................... | F21V 33/0036 220/574 |
| 2009/0058662 A1 | 3/2009 | Wang | | |

\* cited by examiner

*Primary Examiner* — Julie Bannan

(57) ABSTRACT

An illuminated eating utensil and container system includes a plurality of utensils. Each of the utensils includes a handle that is translucent. A head is attached to a first end of the handle. A light emitter is mounted at a juncture of the head and the handle and is directed towards a second end of the handle. The light emitter illuminates the handle when the light emitter is turned on. A battery is mounted in the head and is electrically coupled to the light emitter.

1 Claim, 3 Drawing Sheets

ILLUMINATED EATING UTENSIL AND CONTAINER SYSTEM

BACKGROUND OF THE DISCLOSURE

Field of the Disclosure

The disclosure relates to illuminated eating utensils and more particularly pertains to a new illuminated eating utensil for assisting a person in finding and using eating utensils during low light conditions.

SUMMARY OF THE DISCLOSURE

An embodiment of the disclosure meets the needs presented above by generally comprising a plurality of utensils. Each of the utensils includes a handle that is translucent. A head is attached to a first end of the handle. A light emitter is mounted at a juncture of the head and the handle and is directed towards a second end of the handle. The light emitter illuminates the handle when the light emitter is turned on. A battery is mounted in the head and is electrically coupled to the light emitter.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
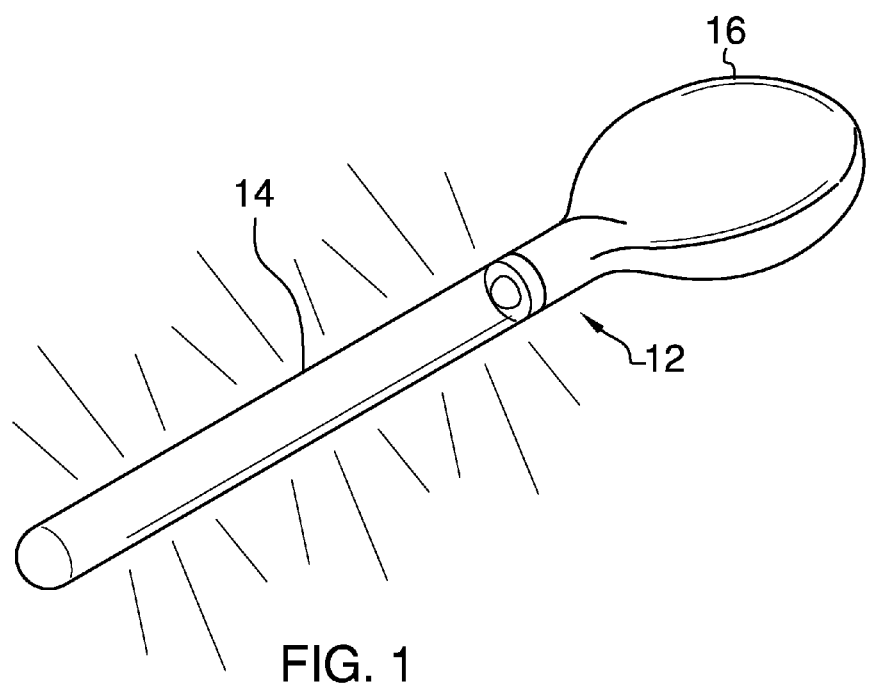
FIG. 1 is a top perspective view of an illuminated eating utensil and container system according to an embodiment of the disclosure.
Figure 2:
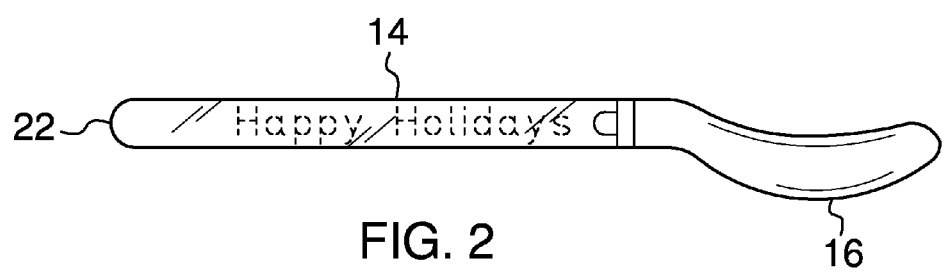
FIG. 2 is a side view of an embodiment of the disclosure.
Figure 3:
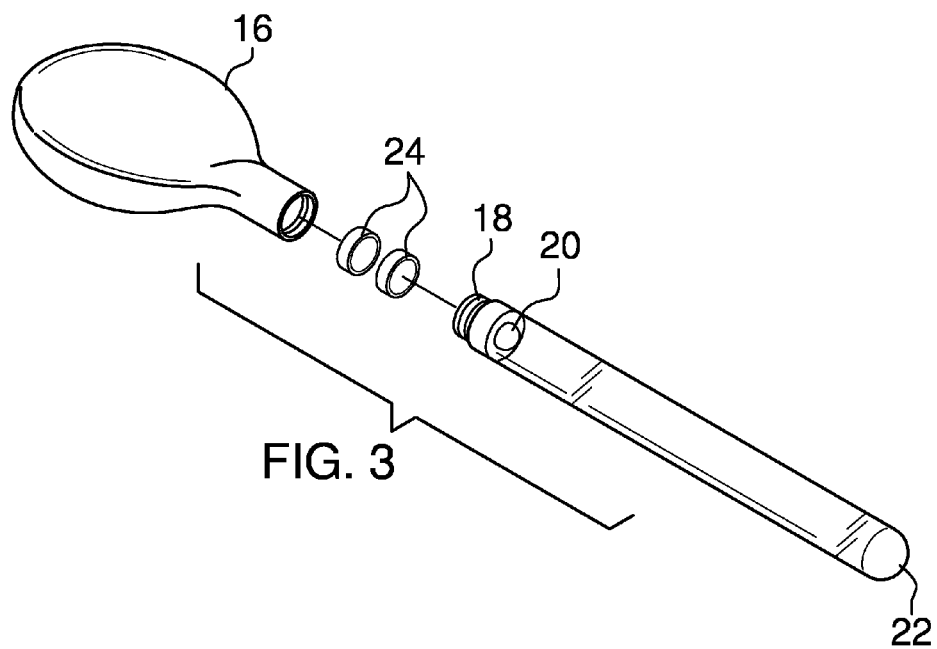
FIG. 3 is an exploded perspective view of an embodiment of the disclosure.

With reference now to the drawings, and in particular to FIGS. 1 through 6 thereof, a new illuminated eating utensil embodying the principles and concepts of an embodiment of the disclosure and generally designated by the reference numeral 10 will be described.

Figure 4:
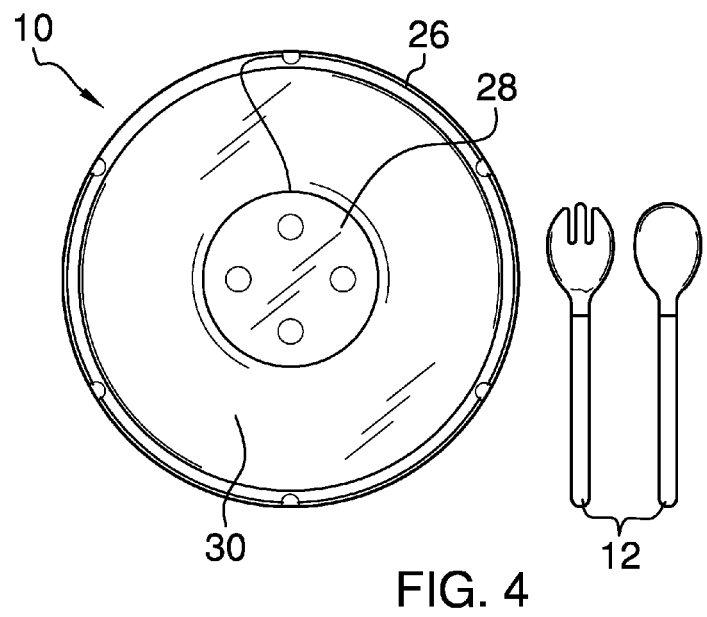
FIG. 4 is a top view of an embodiment of the disclosure.
Figure 5:
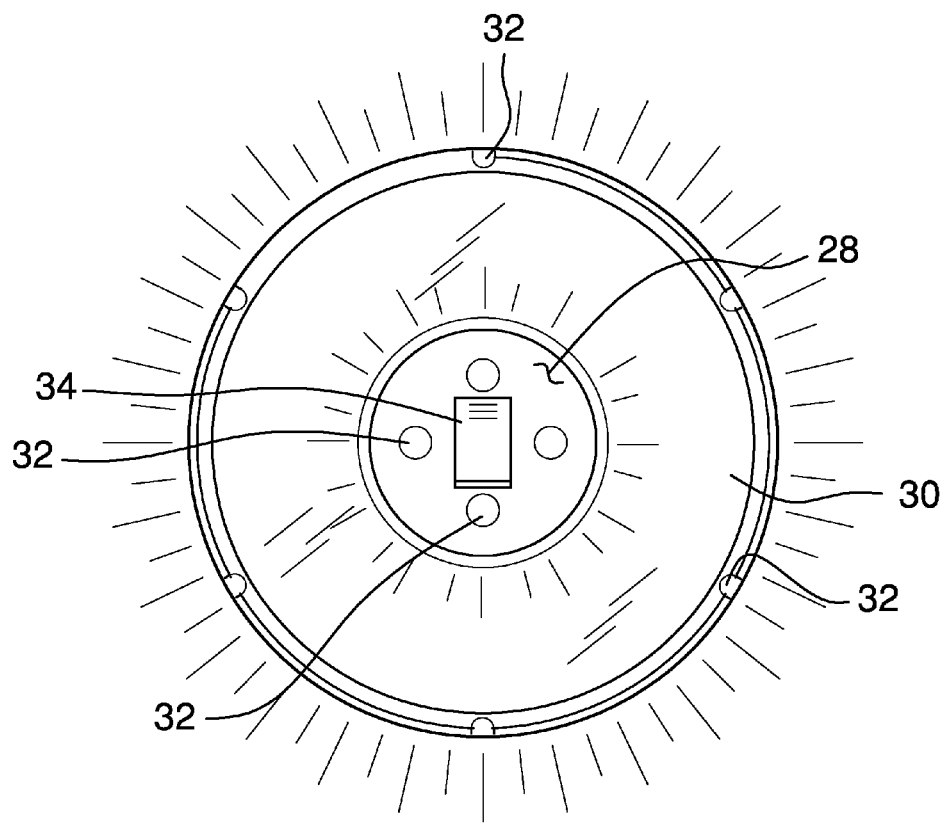
FIG. 5 is a bottom view of an embodiment of the disclosure.

As best illustrated in FIGS. 1 through 6, the illuminated eating utensil and container system 10 generally comprises a plurality of utensils 12, each of the utensils 12 includes a handle 14 wherein the handle 14 is translucent. A head 16 is attached to a first end 18 of the handle 14 and may be translucent but which may also be opaque to hide interior components of the system 10. A light emitter 20 is mounted at a juncture of the head 16 and the handle 14 and is directed towards a second end 22 of the handle 14. The light emitter 20 illuminates the handle 14 when the light emitter 20 is turned on. The light emitter 20 may comprise a light emitting diode. The handle 14 may be removable from the head 16 and more particularly the handle 14 may be threadably coupled to the head 16. A battery 24, or multiple batteries, is mounted in the head 16 and is electrically coupled to the light emitter 20. The battery 24 powers the light emitter 20 to illuminate the handle 14. The utensils 12 may include any utensil for eating or serving food and typically at least one of the utensils 12 will comprise a spoon and at least one of the utensil comprise a fork as is shown in FIG. 4

A container 26 may also be provided within the system 10. It should understand the container 26 may include any typical food or fluid containment vessel including bowls, cups, mugs, pitches and the like. The container 26 includes a bottom wall 28 and a perimeter wall 30 that is attached to and extending upwardly from the bottom wall 28 and wherein the perimeter wall 30 is translucent. The bottom wall 28 may also be translucent. A plurality of lights 32 is within the perimeter wall 30 of the container 26. The lights 32 are typically to be comprised of light emitting diodes. The lights 32 illuminate the perimeter wall 30 when the lights 32 are turned on. As can be seen in FIG. 4, the bottom wall 28 may also have lights 32 mounted within its interior. One or more batteries 24 are mounted within the bottom wall 28 and are electrically coupled to the lights 32. The bottom wall 28 includes an access door 34 for accessing the battery.

The system 10 may further include a structure wherein the container 26 further includes a sound emitter 38 electrically coupled to the battery 24. The sound emitter 38 emits a sound at ultrasonic frequencies not detectable by humans but which repel insects. The sound emitter 38 is turned on when the lights 32 are turned on. The sound emitter 38 may be mounted in the bottom wall 28.

Figure 6:
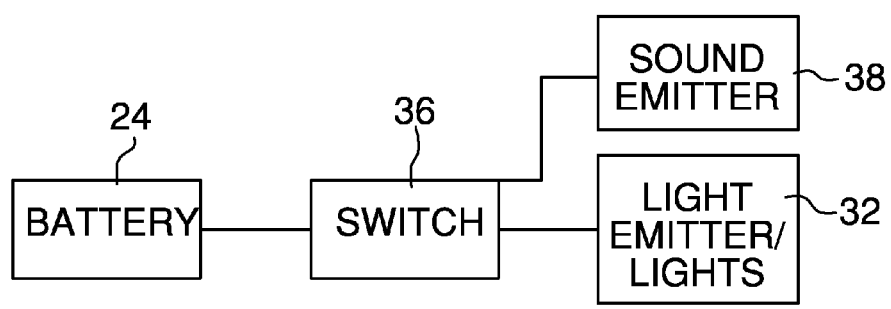
FIG. 6 is a schematic view of an embodiment of the disclosure.

FIG. 6 shows a schematic view of both of the utensils 12 and container 26 of the system 10. As can be seen, a switch 36, which may include a toggle switch, pressure switch or the like may be incorporated into the utensils 12 or the container 26 for selectively turning the light emitters 20 or lights 32 on or off.

In use, the system 10 is used in a conventional manner that one would utilize eating and serving containers and utensils. However, the utensils 12 and container 26 will be self-illuminating for easy use during times of low light where it is difficult to see and use non-illuminated versions of these structures.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An illuminated eating assisting system comprising:
a plurality of utensils, each of said utensils including:
  a handle, said handle being translucent;
  a head being attached to a first end of said handle, said head being opaque;
  a light emitter being mounted at a juncture of said head and said handle and being directed towards a second end of said handle, said light emitter illuminating said handle when said light emitter is turned on, said light emitter comprising a light emitting diode;
  a battery being mounted in said head and being electrically coupled to said light emitter;
at least one of said utensils comprising a spoon and at least one of said utensil comprising a fork;
a container including a bottom wall and a perimeter wall being attached to and extending upwardly therefrom, said perimeter wall being translucent;
a plurality of lights being within said perimeter wall of said container, said lights illuminating said perimeter wall when said lights are turned on;
a battery being mounted within said bottom wall and being electrically coupled to said lights; and
a sound emitter electrically coupled to said battery in said bottom wall, said sound emitter emitting an ultrasonic sound configured to repel insects when said lights are turned on.

* * * * *